UNITED STATES PATENT OFFICE.

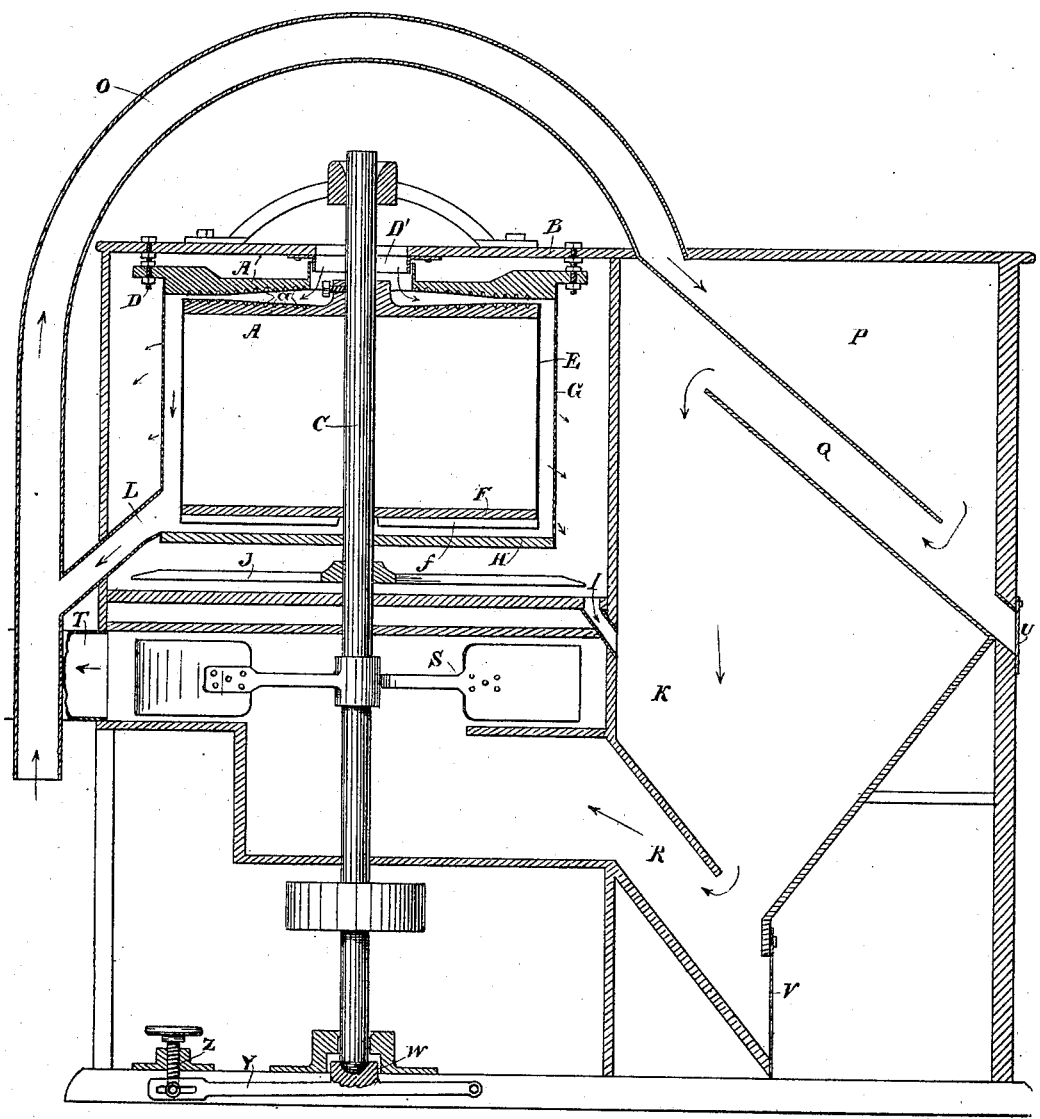

JOHN FREY, OF SAN MIGUEL, CALIFORNIA.

MACHINE FOR DEGERMINATING WHEAT.

SPECIFICATION forming part of Letters Patent No. 668,287, dated February 19, 1901.

Application filed October 2, 1899. Serial No. 732,300. (No model.)

*To all whom it may concern:*

Be it known that I, JOHN FREY, a citizen of the United States, residing at San Miguel, county of San Luis Obispo, State of California, have invented an Improvement in Machines for Scouring and Degerminating Wheat; and I hereby declare the following to be a full, clear, and exact description of the same.

My invention relates to a machine which is designed to scour and to remove the germs from wheat.

It consists of the parts and the constructions and combinations of parts hereinafter described and claimed.

The figure is a vertical section of an apparatus designed for the purpose.

In the manufacture of wheaten flour certain objectionable features in coloring and other characteristics appear which are not removed by the removal of the outer surrounding cuticle of the grain. These objectionable features are known to be produced by the germ, which is a small nitrogenous body contained in one end of the grain and having in itself a shape very similar to the larger grain in which it is embedded.

It is the object of my invention to remove this germ from the grains of wheat before the latter are ground.

In the present case I have shown my apparatus as consisting of smooth-surface metallic disks A A', provided with pits or pockets, with the surfaces between the latter smooth, so as to secure a greater freedom of the grain from friction. As here shown, one of the disks is adjustably fixed to a suitable framework or support B, and the other is fixed upon a vertical shaft C, to which power may be applied in any suitable manner, so as to rotate it. As here shown, the upper disk A' is the fixed one, and by means of adjusting-screws D it may be moved and its position with relation to the lower disk regulated to suit. There is an open space in the center of the upper disk, as shown at D', through which the grain is delivered, so as to pass outwardly between the two disks. The disks are made slightly concaved, so that they are at the greatest distance apart near the center, and the outer portion of the disks is made flat and approximately parallel, and they are adjusted to stand at such a distance apart that when the wheat reaches this portion the grains will fall into the pits or pockets with one end projecting, so that the rotation of one of the disks with relation to the other will cut or clip the ends of the wheat, breaking it and the outer skin sufficiently to expose the germ and allow it to fall out or be removed by the further action while the wheat is passing through the apparatus.

The germ is contained in only one end of each grain; but in order to be sure of removing it it would be necessary that the wheat-grains fall repeatedly into the pits or pockets, and they will naturally be reversed many times while passing from the center to the peripheries of the disks, thus insuring the clipping of both ends of every grain and the removal of the germ. In preparing the wheat for this operation it is first cleaned and tempered and then introduced into the space between the disks or other surfaces. As it passes outward by centrifugal action it is subjected to the scouring which is necessary in the preparation of wheat to remove a certain outer husk and fine filaments adhering thereto, and as the wheat approaches the peripheries of the disks it will fall repeatedly into the pits or pockets $a$, with the ends presented so that they will be clipped by the mutual action of the disks and the sharp edges of the holes of the uppermost one. The disks being made with smooth surfaces, the grain in its passage between them has a greater freedom from friction in the smooth surfaces of the "lands" bounding the pits or pockets than if said disks were of stone and the surfaces thereof were rough, in which latter case the grain would have less freedom from friction in the surfaces bounding the pits than is obtained in the surfaces of my disks.

A cylindrical shell E has its upper edge fixed to the periphery of the lower disk A and its lower edge to a similar disk F, mounted upon the shaft C. The upper disk projects slightly beyond the inner one, as shown, and the cylindrical screen G has its upper edge fixed to the periphery of this disk and its lower edge to a disk H, which also surrounds the shaft. When the grain passes out from between the disks it falls into the space between the inner shell E and the screen G, and by the rapid revolution of the inner portion the dust and fine impurities are thrown out through the screen, and falling downward they pass out through the discharge-passage I, aided by the suction of the fan.

Agitators J are fixed upon the shaft below the disk H, and by their rotation they sweep the dust and impurities around until they arrive at the discharge-opening I, through which they pass into a receptacle K, which forms part of the apparatus to be hereinafter described. The grain falling down between the cylindrical shell E and the screen G reaches the table or disk H, and by means of arms $f$, fixed upon the bottom of the disk F and sweeping around within the space above the disk H, the grain is carried around to a discharge-opening L, through which it passes into an uptake or channel O. This passage leads in any desired manner so as to discharge into a chamber P, having a sufficiently-larger capacity than the passage to allow the current of air to become partially quiet. From this chamber a passage Q leads upwardly and, as here shown, at an angle and discharges into the upper part of the chamber K, which is also enlarged to produce a partial quiet of the current. From the bottom of the chamber K a passage R leads into the suction-fan chamber, as shown, where the fan S revolves and produces a vacuum. A discharge from the fan-chamber takes place through a passage, as shown at T.

The operation will then be as follows: The rotation of the fan produces a certain amount of vacuum through all the passages and chambers heretofore described, and this is sufficient to draw the germs and any remaining impurities up through the passage O, while the wheat is discharged from the lower end of this passage for further treatment. When the germs and fine impurities have reached the chamber P, the greater quietude of the air in this chamber allows the heavier germs to settle down to the lower end of the inclined passage Q. This is covered by a gate U, fixed at the upper edge and having a light pressure, either by its own elasticity or supplemental spring or other device, so that it will remain closed to the admission of air, but will, when a sufficient amount of the germs have accumulated against it, be forced open to allow them to be discharged. The finer impurities pass on through the passage Q into the enlarged chamber K, where a like action takes place, and all the impurities which have entered this chamber through the passage I and from the passage Q and which have sufficient weight will fall into the lower end of the inclined passage R, where a gate V is situated similar to the gate U, previously described, and through this gate the impurities will be discharged from time to time when they have collected in sufficient quantity.

The lower end of the shaft C rests and turns upon a step, as shown at W. I have here shown this step as supported upon a lever-arm Y, one end of which is pivoted or fulcrumed and the other connected with a screw Z, by which it may be raised or lowered, and with it the step W, thus adjusting the shaft and the disk carried thereby from below as different wheat requires to scour it or remove the germ.

Having thus described my invention, what I claim as new, and desire to secure by Letters Patent, is—

1. An apparatus for scouring and degerminating wheat and like grains, including contiguous smooth-surface metallic disks, one movable with relation to the other and each having pockets or pits with sharp edges or angles whereby the grain may fall into the pockets or pits of one disk with the end projecting to be acted upon by the edges of the pockets or pits of the other disk, said disks having the adjacent faces concaved to form an outwardly-converging space into which the grain is loosely received and thrown outward toward the periphery, and means for revolving the lower disk at a high speed to impart centrifugal action to the grain.

2. An apparatus for scouring and degerminating wheat and like grains comprising contiguous metallic disks each having pits or pockets made in them so that the grain may fall into the pits or pockets of one of said disks with the end projecting to be acted upon by the edges of the pits or pockets of the other disk, means for supplying grain between the disks, a shaft fixed to the lower metallic disk to rotate the latter relative to the companion disk, a disk fixed to said shaft below the rotatable disk and a shell connecting the upper and lower rotatable disks, a screen fixed to the upper stationary disk and a disk below the shell and fixed to the screen, a separator including a fan and air passages and chambers for the deposited material, and independent passages whereby the material discharged from the screen and the shaved and cut grain are delivered to the separator.

3. An apparatus for scouring and degerminating wheat and like grains consisting of metallic disks, the upper disk adjustably mounted upon a fixed support and the lower disk fixed upon a shaft by which it may be rotated, said disks having smooth surfaces and having pits or pockets made in their adjacent faces whereby the grain passing between said faces will fall into the pits or pockets of the lowermost disk with the ends projecting outwardly, whereby they are shaved or cut by the action of the opposing disk, an interior closed and an exterior screen-surface between which the grain passes so that dust is discharged through the screen, a disk fixed to the shaft and to the closed screen-surface and surrounding said shaft, a discharge-passage for the dust, a second discharge-passage through which the wheat passes, and a suction-fan and connecting-passages and enlarged chambers connecting opposite ends with the passages, by which the germs and impurities are separated from the wheat and carried to a discharge while the wheat is delivered to another discharge.

In witness whereof I have hereunto set my hand.

JOHN FREY.

Witnesses:
S. H. NOURSE,
JESSIE C. BRODIE.